Figure 1:
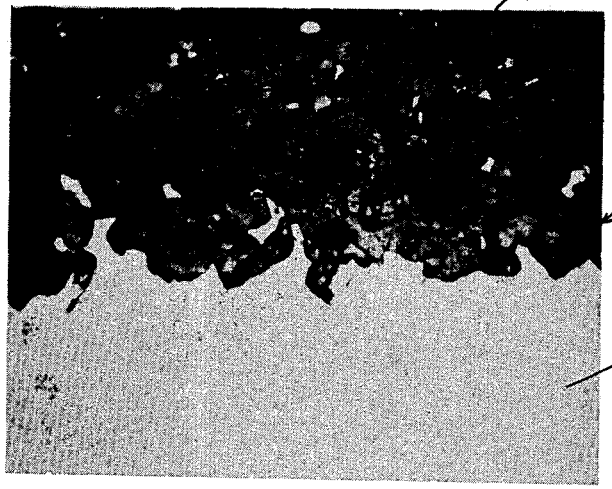

Nov. 12, 1968 R. H. HILTZ 3,410,716
COATING OF REFRACTORY METALS WITH METAL MODIFIED OXIDES
Filed April 1, 1965

Inventor
Ralph H. Hiltz
by Hill, Sherman, Meroni, Gross & Simpson
Attys.

3,410,716
COATING OF REFRACTORY METALS WITH
METAL MODIFIED OXIDES
Ralph H. Hiltz, Euclid, Ohio, assignor to
TRW Inc., a corporation of Ohio
Continuation-in-part of abandoned application Ser. No.
139,617, Sept. 21, 1961. This application Apr. 1, 1965,
Ser. No. 445,870
14 Claims. (Cl. 117—93.1)

This application is a continuation-in-part of my copending Ser. No. 139,617, filed Sept. 21, 1961, now abandoned.

The present invention relates to the coating of refractory metals, particularly the coating of tungsten and tungsten alloys containing at least 50% by weight tungsten. The coating of the present invention employs an improved metal modified oxide system which exhibits substantially greater bonding to tungsten based materials than could heretofore be obtained in other types of metal oxide systems.

Metal modified oxide systems in which the desirable properties of a refractory oxide are combined with controlled amounts of a refractory metal find use in various fields. However, bodies of these materials have been successfully prepared only under very carefully controlled laboratory conditions, and only in small sizes. In general, two techniques have been used for their manufacture. The first involves direct pressing and sintering of mixtures of the oxide powder and the metal powder, and the second involves reaction of the blended powders followed by pressing and sintering. In both cases, the bodies which result tend to crack on sintering, due to a variety of reasons.

One of the fields in which metal modified oxide systems would find particular use is that of rocket nozzle structures. Such structures, employing high energy solid propellants, frequently employed tungsten as the non-eroding nozzle throat insert, backed by suitable insulating and supporting materials. These backing materials are quite reactive with tungsten at the temperature achieved in the nozzle, and present designs require that a barrier layer be inserted on the backside of the tungsten. Zirconium dioxide has been found to be a readily available material which has a high enough melting point and is sufficiently chemically stable to act as a barrier. Zirconia, however, does not readily bond to tungsten, it has a large thermal expansion, and it has poor thermal shock resistance. These effects cause the zirconia to separate and spall from the tungsten surface during rapid heating. The present invention overcomes this difficulty by providing a coating which is readily bondable to tungsten, and which provides a zirconia based barrier which retains all of the desirable properties of the refractory oxide.

Another field in which the objects of the present invention are particularly suitable is that of coated extrusion or forging dies. The coated dies of the present invention provide excellent insulation so as to prevent die deterioration, and provide abrasion and spalling resistance to prevent tapering and surface deterioration of the extrusion.

One of the objects of the present invention is to provide an improved refractory metal object having a surface barrier layer thereon evidencing good adherence to refractory metal bases.

Another object of the invention is to provide a tungsten body coated with a barrier layer including a refractory metal oxide such as zirconia containing a sufficient amount of a refractory metal to make it readily bondable to the underlying tungsten base.

Still another object of the invention is to provide a tungsten body with a barrier layer thereon which resists cracking upon thermal cycling.

In accordance with the present invention, the refractory metal body consisting of a tungsten or tungsten base alloy containing at least 50% by weight tungsten is coated with a refractory oxide powder containing less than an equimolar amount of a refractory metal powder which is usually tungsten. Molybdenum can be used in place of all or part of the tungsten if lower melting points can be tolerated. The powder mixture is then pressed to produce a compact and this "green" compact is then sintered at conditions sufficient to alloy the metal within the lattice of the oxide. During this sintering, the oxide dissolves and absorbs the refractory metal so that the metal is in the discontinuous phase. Finally, the alloy which results may be subdivided by a suitable powdering means into appropriate sized fractions for subsequent use as a coating material. In the preferred form of the present invention, the powder is reduced to a sufficient size to make it applicable in the plasma spray coating of the tungsten base object.

The coating compositions used in accordance with the present invention should not be confused with typical "cermet" systems which employ combinations of metals and metal oxides. In cermet systems, the requirement is that the metal wet the ceramic to obtain a good bond, and that the metal be the continuous phase. In the metal modified coating oxide systems of the present invention, the metal is only a means of improving particular properties of the ceramic, and the properties of the metal are not involved per se. The requirements here are not only wetting of the ceramic but actual solution of the metal in the oxide lattice, so that free metal in the system is kept at a minimum, and never becomes the continuous phase. Thus, the metal improves the bonding properties of the refractory metal oxide powder to the base, but the thermal resistance properties of the coating are essentially those of the oxide, not the metal.

The present invention makes particular use of the systems zirconia-tungsten, hafnia-tungsten, and thoria-tungsten. In the case of the zirconia-tungsten and the hafnia-tungsten systems, it has been found that a minimum of about 10 mol percent tungsten in the metal modified oxide, and a maximum of about 25 mol percent provides materials which retain the insulating properties of the respective oxides but in which the tungsten does not become a continuous phase. In the case of the thoria-tungsten combination, the mol percentage of tungsten can be increased to the range of 15 to 30% to achieve similar results.

In preparting the coating materials of the present invention, the starting materials are powders less than 325 mesh, and the metal powder most desirably is in the range from about 3 to 5 microns in diameter. The powders are blended in correct proportions and formed into a suitable shape for sintering by powder pressing. The pressing can be performed either by conventional or hydrostatic means at pressures from 25 tons per square inch upwardly. Then, the green compact is sintered to achieve alloying of the metal within the crystalline lattice of the oxide under non-oxidizing conditions, as in an atmosphere of hydrogen or in vacuum. For this sintering step, the minimum temperature is about 3500° F., and a minimum time of about 4 hours is required at the final temperature. The sintered mass is then crushed to powder by any of several suitable methods.

The compositions of the present invention can also include other additives for various purposes. For example, zirconia is frequently stabilized by the addition of small amounts of 2 to 5% by weight, of a stabilizing oxide such as calcium oxide, magnesium oxide, molybdenum oxide, tungsten oxide, columbium pentoxide, tantalum pentoxide, or one of the rare earth oxides such as yttrium oxide or lanthanum oxide. The same oxides may also be incorporated into the hafnia system for stabilization, but are not as necessary there as they are in the case of zirconia. Thoria systems require no stabilization.

It is also possible to modify the oxide compositions to increase their melting point so that they are able to withstand higher operating pressures. Thus, zirconia can be replaced with a mixed oxide of zirconium and strontium having the formula $SrZrO_4$. This material, when combined with sufficient tungsten to provide a 15 mol percent tungsten concentration has a melting point of about 5300° F. as compared to a melting point of about 4820° F. for zirconia.

The following specific example illustrates the method of the present invention as applied to a specific composition, but it will be recognized that the same techniques can be used with other materials, with suitable modifications in temperatures and concentrations.

*Example*

A mixture was made up of 80 mol percent of calcia stabilized zirconia powder having a particle size of less than 325 mesh, with 20 mol percent of tungsten powder having a particle size of about 5 microns. The blended material was pressed into blocks measuring 2 x 2 x ½ inch, under hydrostatic pressure of 25 tons per square inch. The blocks were then sintered at 4000° F. in a vacuum of less than 1 micron absolute pressure for 4 hours. The sintered blocks were then crushed in a jaw crusher and ball mill, and separated into fractions for use as a spray powder in a plasmas spraying process.

Figure 2:
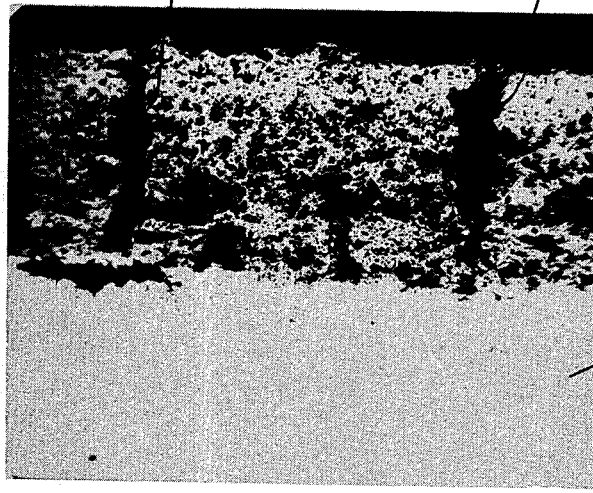

To make comparative tests, the oxide mixture containing the 20 mol percent tungsten was plasma sprayed onto a tungsten article, and unalloyed zirconia powder of the same particle size as the tungsten containing material was plasma sprayed onto the tungsten base under the same conditions of plasma spraying. The two coated objects were then exposed to high temperatures, after which photomicrographs were made of the resulting structure. These photomicrographs were reproduced in enlarged form in the drawings in which:

FIGURE 1 is a psotograph illustrating the interfacial bonding between the tungsten and the metal-modified zirconia after 15 minutes at 4500° F.; and FIGURE 2 is a photomicrograph taken at the same degree of enlargement of the unmodified zirconia coating on tungsten after 120 seconds at 4500° F.

In FIGURE 1, reference numeral 10 indicates generally the coated object consisting of a tungsten base 11 and a colsolidated, impervious coating 12 consisting of zirconia particles which contain tungsten dissolved in the crystalline lattice thereof, the zirconia particles constituting the continuous phase of the coating, and being bonded together by the heat of the plasma spray gun into a coherent sintered coating. From FIGURE 1, it will be seen that the coating retains its integral character even after prolonged exposure to temperatures of 4500° F.

In FIGURE 2, reference numeral 14 indicates the tungsten base, the reference numeral 15 the unmodified zirconia coating which had been applied to the base under the same conditions of application as the coating of FIGURE 1. It will be seen from FIGURE 2 that after only 120 seconds at the elevated temperature, the zirconia coating showed fissures 16 resulting in spalling of the coating from the tungsten body 14 and rendering it incapable of further protecting the surface of the tungsten.

While the thickness of the coating will vary depending upon specific applications, it is advisable to apply a coating of at least 2 mils of the metal modified refractory powder, and thicknesses in excess of 20 mils are usually unnecessary.

Another type of structure for which the coated refractory bodies of the present invention find use is that of insert material for uncooled liquid propellant rocket nozzles. The exhaust from low thrust liquid rocket engines is rich in oxygen, normally running at 30% free oxygen or oxidizing components. This environment rapidly attacks graphite, carbides, and metals. The normal oxidation resistant ceramic materials do not possess sufficient thermal shock resistance to serve as insert materials. The metal modified system containing 15 mol percent tungsten and the balance zirconia, however, possesses the necessary properties to be a suitable insert material. In plasma jet firings of this material, it has withstood severe thermal shock. In the first few seconds of firing there was some oxidation of the tungsten in the surface layer, but since the tungsten is not in a continuous phase, after depletion of the tungsten on the surface layer the only way tungsten could be oxidized was by diffusion into the surface layer. This diffusion takes place at a very slow rate. A 60 second firing at 4800° F. resulted in a tungsten depleted layer of only from 2 to 3 mils. The tungsten depletion occurred at a high enough temperature so that there was no deterioration of the insert contour.

The comparative bond strengths of plasma spray coatings of conventional and metal modified oxides were compared in the following manner. A five mil thick coating of the two materials was applied on a 0.250 inch diameter by ½ inch long tungsten rod. The shear load required to force the specimen through a 0.250 inch hole was then determined. The following table lists the results obtained:

Table I

| Coating: | Average load to produce bond failure (lbs.) |
|---|---|
| Zirconia | 100.1 |
| Zirconia +20 mol percent tungsten | 147.5 |
| Thoria | 39.1 |
| Thoria +14.7 mol percent tungsten | 130.6 |

It should be evident that various modifications can be made to the described embodiments without departing from the scope of the present invention.

I claim as my invention:

1. A refractory metal object comprising a base of tungsten metal having a surface barrier layer thereon consisting essentially of a refractory oxide powder selected from the group consisting of zirconia, hafnia, and thoria, having alloyed therein a refractory metal selected from the group consisting of tungsten and molybdenum, said refractory metal being alloyed within the lattice of said oxide and being in a discontinuous phase.

2. A refractory metal object a base of tungsten having a surface barrier layer thereon consisting essentially of zirconia particles having from 10 to 25 mol percent tungsten alloyed within the lattice of said zirconia.

3. A refractory metal object comprising a base of tungsten having a surface barrier layer thereon consisting essentially of hafnia particles having from 10 to 25 mol percent tungsten alloyed within the lattice of said hafnia.

4. A refractory metal object comprising a base of tungsten having a surface barrier layer thereon consisting essentially of thoria particles having from 15 to 30 mol percent tungsten alloyed within the lattice of said thoria.

5. The object of claim 2 in which said zirconia contains from 2 to 5% by weight of a heat stabilizing oxide.

6. The object of claim 2 in which substantially all of said zirconia particles are in the form of a mixed oxide of zirconia and strontium having the formula $SrZrO_4$.

7. A refractory metal object comprising a base of tungsten metal having a surface barrier layer thereon consisting essentially of an impervious layer of a metal oxide selected from the group consisting of zirconia, hafnia, and thoria, said oxide having dissolved in its crystalline lattice a refractory metal selected from the group consisting of tungsten and molybdenum, the thickness of said layer being at least 2 mils, the dissolved metal being in a discontinuous phase.

8. A refractory metal object comprising a base of tungsten metal having a surface barrier layer thereon consisting essentially of an impervious layer of a metal oxide selected from the group consisting of zirconia, hafnia, and thoria, said oxide having dissolved in its crystalline lattice a refractory metal selected from the group consisting of tungsten and molybdenum, the thickness of said layer being from 2 to 20 mils, the dissolved metal being in a discontinuous phase.

9. A refractory metal object comprising a base of tungsten having a surface barrier layer thereon consisting essentially of zirconia particles having from 10 to 25 mol percent tungsten alloyed within the lattice of said zirconia, the thickness of said layer being at least 2 mils.

10. A refractory metal object comprising a base of tungsten having a surface barrier layer thereon consisting essentially of hafnia particles having from 10 to 25 mol percent tungsten alloyed within the lattice of said hafnia, the thickness of said layer being at least 2 mils.

11. A refractory metal object comprising a base of tungsten having a surface barrier layer thereon consisting essentially of thoria particles having from 15 to 30 mol percent tungsten alloyed within the lattice of said thoria, the thickness of said layer being at least 2 mils.

12. The object of claim 9 in which said zirconia contains from 2 to 5% by weight of a heat stabilizing oxide.

13. The method of coating a tungsten base object which comprises plasma spraying thereon a powdered ceramic composition consisting essentially of a refractory oxide powder selected from the group consisting of zirconia, hafnia, and thoria, having dissolved in its crystalline lattice a refractory metal selected from the group consisting of tungsten and molybdenum, the dissolved metal being substantially confined to the crystalline lattice of said oxide and being substantially in a discontinuous phase.

14. The method of claim 13 in which said zirconia particles contain from 10 to 25 mol percent tungsten alloyed within the lattice of said zirconia.

References Cited

UNITED STATES PATENTS

| | | | |
|---|---|---|---|
| 1,915,186 | 6/1933 | Hale | 117—221 X |
| 2,023,707 | 12/1935 | Spanner et al. | 117—221 X |
| 2,198,329 | 4/1940 | Bruining et al. | 117—221 X |
| 2,698,913 | 1/1955 | Espersen | 117—221 X |
| 3,016,311 | 1/1962 | Stackhouse | 117—105.2 X |
| 3,016,447 | 1/1962 | Gage et al. | 117—93.1 X |
| 3,049,432 | 8/1962 | Weber | 106—57 |
| 3,071,678 | 1/1963 | Neeley et al. | 117—93.1 X |
| 3,075,066 | 1/1963 | Yenni et al. | 117—93.1 X |
| 3,091,548 | 5/1963 | Dillon et al. | 117—129 X |
| 3,110,571 | 11/1963 | Alexander et al. | 117—129 X |

OTHER REFERENCES

Cronin, American Ceramic Soc. Bull., vol. 30, #7, 1951, pp. 234–238, Scientific Library, TP 785 A 63.

RALPH S. KENDALL, *Primary Examiner.*